(12) United States Patent
Abdelhamid et al.

(10) Patent No.: US 7,039,007 B1
(45) Date of Patent: May 2, 2006

(54) SYSTEM AND METHOD FOR IMPROVING RELIABILITY OF A PACKET NETWORK

(75) Inventors: Hisham Abdelhamid, Palo Alto, CA (US); Madhav Marathe, Cupertino, CA (US); Mark M. Perkins, Cupertino, CA (US)

(73) Assignee: Cicso Technology, Inc., San Jose, CA (US)

( * ) Notice: Subject to any disclaimer, the term of this patent is extended or adjusted under 35 U.S.C. 154(b) by 967 days.

(21) Appl. No.: 09/629,316

(22) Filed: Jul. 31, 2000

(51) Int. Cl.
*H04L 12/26* (2006.01)

(52) U.S. Cl. .................... 370/218; 370/228; 370/397

(58) Field of Classification Search ........ 370/248–249, 370/252, 352–356, 218–220, 226–228, 235–238, 370/396–397, 395.1–395.51
See application file for complete search history.

(56) References Cited

U.S. PATENT DOCUMENTS

| 4,455,644 | A |   | 6/1984  | Fox et al. |
|-----------|---|---|---------|-----------|
| 4,471,480 | A |   | 9/1984  | Haussmann et al. |
| 4,633,246 | A |   | 12/1986 | Jones et al. |
| 4,841,560 | A |   | 6/1989  | Chan et al. |
| 5,278,977 | A |   | 1/1994  | Spencer et al. |
| 5,337,307 | A |   | 8/1994  | Sato et al. |
| 5,598,403 | A | * | 1/1997  | Tatsuki ........................ 370/221 |
| 5,634,097 | A |   | 5/1997  | Ashi et al. |
| 5,646,936 | A | * | 7/1997  | Shah et al. .................. 370/228 |
| 5,648,965 | A |   | 7/1997  | Thadani et al. |
| 5,659,540 | A |   | 8/1997  | Chen et al. |
| 5,671,215 | A | * | 9/1997  | Foglar ........................ 370/227 |
| 5,710,760 | A |   | 1/1998  | Moll |
| 5,781,528 | A | * | 7/1998  | Sato et al. .................. 370/218 |
| 5,812,528 | A |   | 9/1998  | VanDervort |
| 5,848,055 | A | * | 12/1998 | Fedyk et al. ................ 370/228 |
| 5,864,555 | A |   | 1/1999  | Mathur et al. |
| 5,872,770 | A |   | 2/1999  | Park et al. |
| 5,898,669 | A |   | 4/1999  | Shimony et al. |
| 5,901,141 | A |   | 5/1999  | Gruber et al. |
| 5,926,456 | A | * | 7/1999  | Takano et al. .............. 370/218 |
| 6,011,780 | A | * | 1/2000  | Vaman et al. ............... 370/237 |
| 6,023,452 | A | * | 2/2000  | Shiragaki ................... 370/227 |
| 6,023,455 | A |   | 2/2000  | Takahashi |
| 6,026,077 | A | * | 2/2000  | Iwata ......................... 370/254 |
| 6,049,542 | A |   | 4/2000  | Prasad |
| 6,222,820 | B1 |  | 4/2001  | Hamami |
| 6,272,107 | B1 | * | 8/2001  | Rochberger et al. ........ 370/216 |
| 6,304,549 | B1 | * | 10/2001 | Srinivasan et al. ......... 370/230 |
| 6,311,288 | B1 | * | 10/2001 | Heeren et al. ................ 714/4 |

(Continued)

OTHER PUBLICATIONS

U.S. Appl. No. 09/586,662—Filed Jun. 1, 2000, entitled "System and Method for Automated Switching of Data Traffic in a Packet Network", Intentor(s) Madhav V. Marathe, et al.

(Continued)

*Primary Examiner*—Zarni Maung
*Assistant Examiner*—Van Kim T. Nguyen
(74) *Attorney, Agent, or Firm*—Blakely, Sokoloff, Taylor & Zafman LLP (57) ABSTRACT

A system and method for improving reliability of a packet network are described. Data is transmitted on a first virtual circuit in the network. A message signaling a failure in receipt of the data is received on a second virtual circuit in the network. Finally, transmission of data is switched to the second virtual circuit within a predetermined period of time.

41 Claims, 8 Drawing Sheets

U.S. PATENT DOCUMENTS

| | | | |
|---|---|---|---|
| 6,377,548 B1 * | 4/2002 | Chuah | 370/233 |
| 6,377,574 B1 | 4/2002 | Endo | |
| 6,424,629 B1 | 7/2002 | Rubino et al. | |
| 6,430,153 B1 | 8/2002 | Hughes et al. | |
| 6,442,132 B1 * | 8/2002 | Burns et al. | 370/218 |
| 6,526,060 B1 | 2/2003 | Hughes et al. | |
| 6,636,484 B1 | 10/2003 | Agrawal et al. | |
| 6,643,254 B1 * | 11/2003 | Kajitani et al. | 370/217 |
| 6,654,342 B1 * | 11/2003 | Dittia et al. | 370/229 |
| 6,657,970 B1 * | 12/2003 | Buckingham et al. | 370/249 |
| 6,661,773 B1 * | 12/2003 | Pelissier et al. | 370/228 |

OTHER PUBLICATIONS

Robert Phillips, "ATM/IP in the 21st Century," IEEE, pp. 1-5 (Oct. 22-24, 1998).

Thomas M. Chen, et al., "Monitoring and Control of ATM Networks Using Special Cells," IEEE, pp. 28-38 (Oct. 1996).

International Telecommunication Union (ITU). ITU-T, I.630. Series 1: Integrated Services Digital Network; Maintenance principles: ATM protection switching (Feb. 1999).

* cited by examiner

SYSTEM AND METHOD FOR IMPROVING RELIABILITY OF A PACKET NETWORK

FIELD OF THE INVENTION

The present invention relates generally to telecommunication systems and, more particularly, to a system and method for improving reliability of a packet network which may carry voice communications.

BACKGROUND OF THE INVENTION

Switching and multiplexing techniques, such as asynchronous transfer mode (ATM) and internet protocol (IP) techniques, are designed for transmitting digital information, such as data, video, and voice, at high speed, with low delay, over a telecommunications network. These networks include a number of switching nodes coupled through communication links.

In these networks, bandwidth capacity is allocated to fixed-sized units named "cells." The communication links transport the cells from a switching node to another. These communication links can support many virtual connections, also named channels, between the switching nodes. The virtual connections, for example a Virtual Channel Connection (VCC) or a Permanent Virtual Circuit (PVC), assure the flow and delivery of information contained in the cells.

The ATM Forum, which is a user and vendor group establishing ATM standards, has also defined several ATM service categories, used in characterization of a virtual connection. For example, among such service categories are (1) a Constant Bit Rate (CBR), which supports a constant or guaranteed rate to transport services, such as video or voice, as well as circuit emulation, which requires rigorous timing control and performance parameters; (2) a Variable Bit Rate (VBR), real time and non real time, which supports variable bit rate data traffic with average and peak traffic parameters; (3) an Available Bit Rate (ABR), which supports feedback to control the source rate in response to changed characteristics in the network; and (4) an Unspecified Bit Rate (UBR).

Figure 1A:
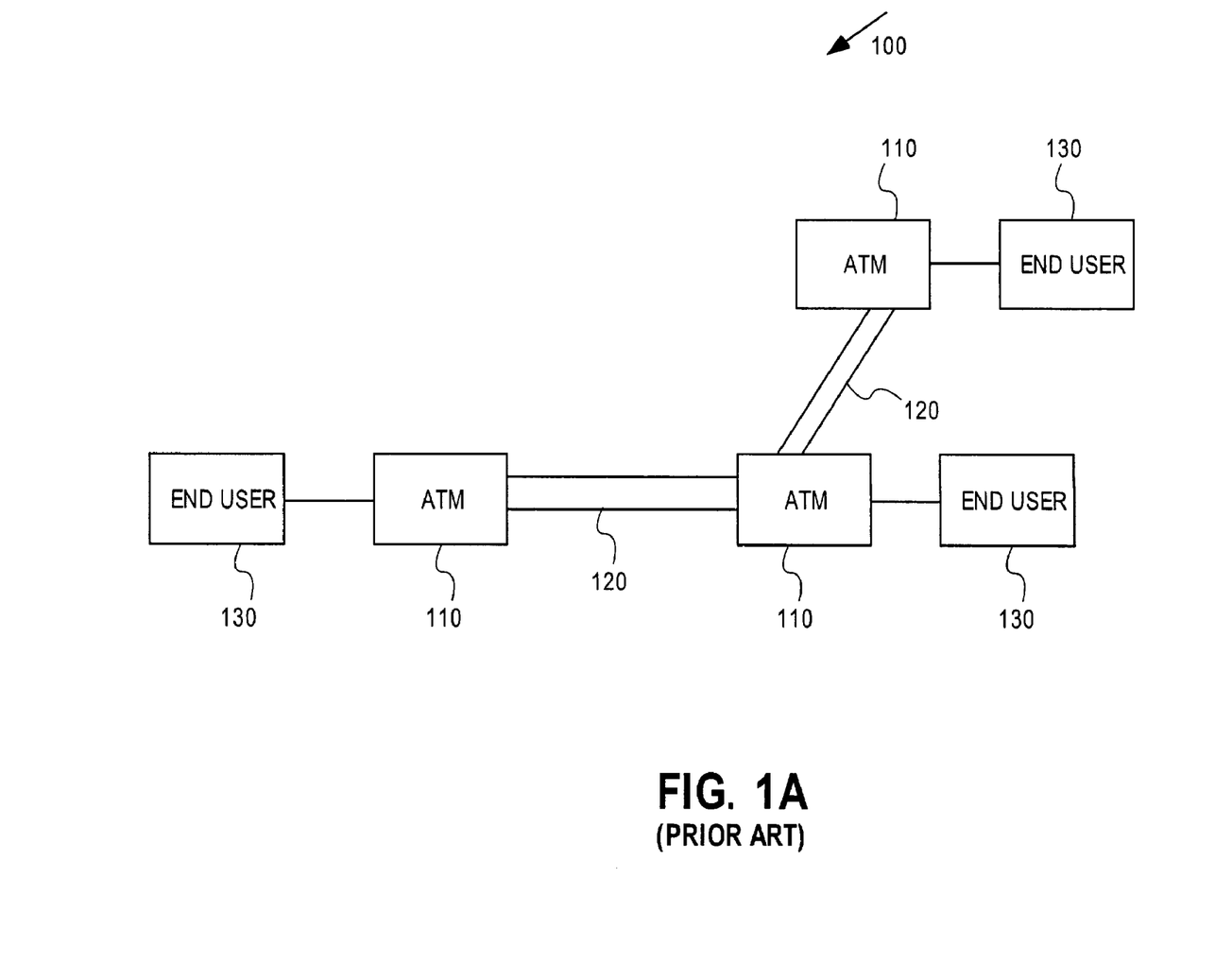
FIG. 1a shows an exemplary connection-oriented network.

FIG. 1a illustrates a prior art packet network 100, typically including several network nodes, also known as switching nodes, 110 connected through single communication links 120. The packet network 100 is a data transmission network with guaranteed bandwidth and quality of service. Typically, end users 130 access the network 100 and connect to the nodes 110 via similar links 120. Generally, the illustrated communication links 120 carry traffic from many sources to many destinations and may support multiple virtual connections. Although these virtual connections may be statistically multiplexed onto the same link, the network 100 must still meet certain quality of service requirements for each connection.

A failure within the network 100 will interrupt the flow of data from a source end user to a destination end user. When the flow of data is interrupted for a longer period of time, typically for a period longer than 500 milliseconds, some voice communications, such as voice calls, carried by the network will be dropped. In order to improve the reliability of networks, several systems have been designed to eliminate such extended data interruptions.

Figure 1B:
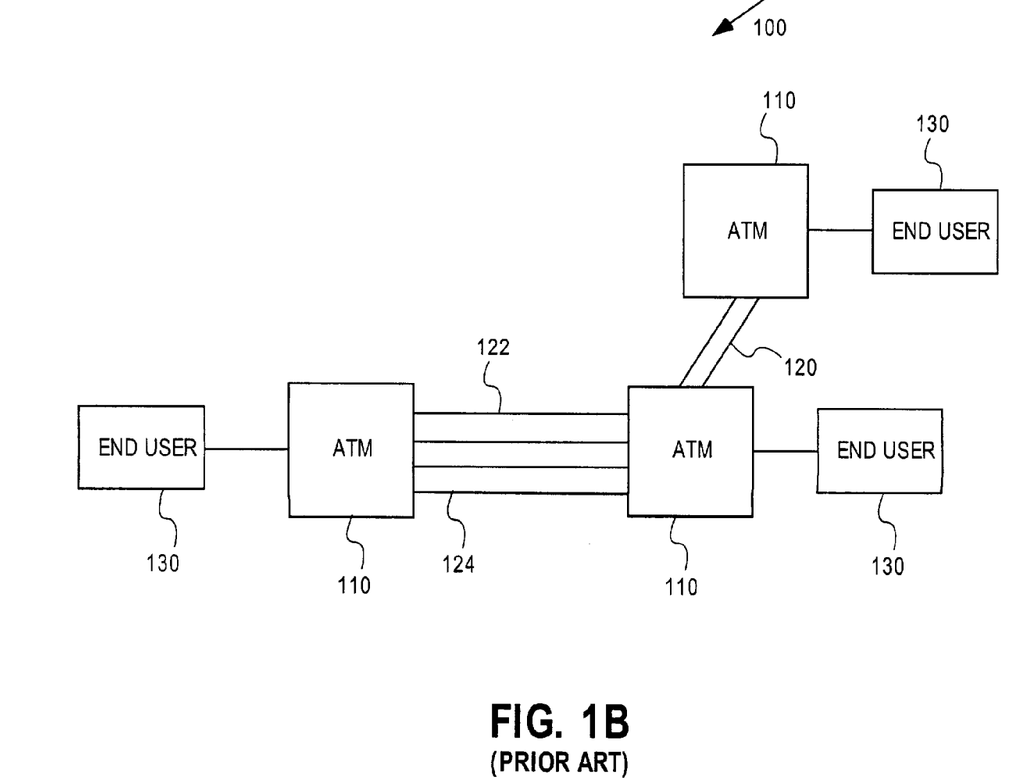
FIG. 1b shows an exemplary connection-oriented network with an example of an Automatic Protection Switching (APS) system.

One such system is an automatic protection switching (APS) system. As illustrated in FIG. 1b, in the packet network 100, parallel links 122, 124 connect the nodes 110 and are used to transmit duplicate information between the nodes 110 and to ensure fast and reliable data transmission. Link 122 is called an "active" link, while link 124 is a "stand-by" link. Because the same information is transmitted on both links 122, 124, the switching node 110 located at the receiving end can choose either link to receive the transmitted information. For example, if the active link 122 fails, the stand-by link 124 can deliver the same information to the switching node. This APS configuration can be implemented, for example, with the SONET/SDH standards, and can also be used to transport data packets instead of voice communications.

Although the APS system addresses link failures and can switch to a redundant link within 250 milliseconds, it cannot solve a node failure, or any other network failure. Also, although the APS system increases the reliability of packet networks, the duplicated data sent on both links 122, 124 reduces the bandwidth in half, resulting in a waste of bandwidth.

SUMMARY OF THE INVENTION

A system and method for improving reliability of a packet network are described. Data is transmitted on a first virtual circuit in the network. A message signaling a failure in receipt of the data is received on a second virtual circuit in the network. Finally, transmission of data is switched to the second virtual circuit within a predetermined period of time.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In one embodiment, the following discussion is presented in the context of a Voice over packet network, such as an Internet Protocol (IP) network. However, the present invention is not limited to IP networks and may be implemented with other types of networks, such as Frame Relay networks or Asynchronous Transfer Mode (ATM) networks. At the same time, the discussion refers to the communication paths into the IP network as virtual circuits (VCs). However, the present invention may be implemented with different types of communication paths or virtual circuits, such as Permanent Virtual Circuits (PVCs), Switched Virtual Circuits (SVCs), or a combination of PVCs and SVCs.

Internet Protocol (IP) Network Implementation

Figure 2:
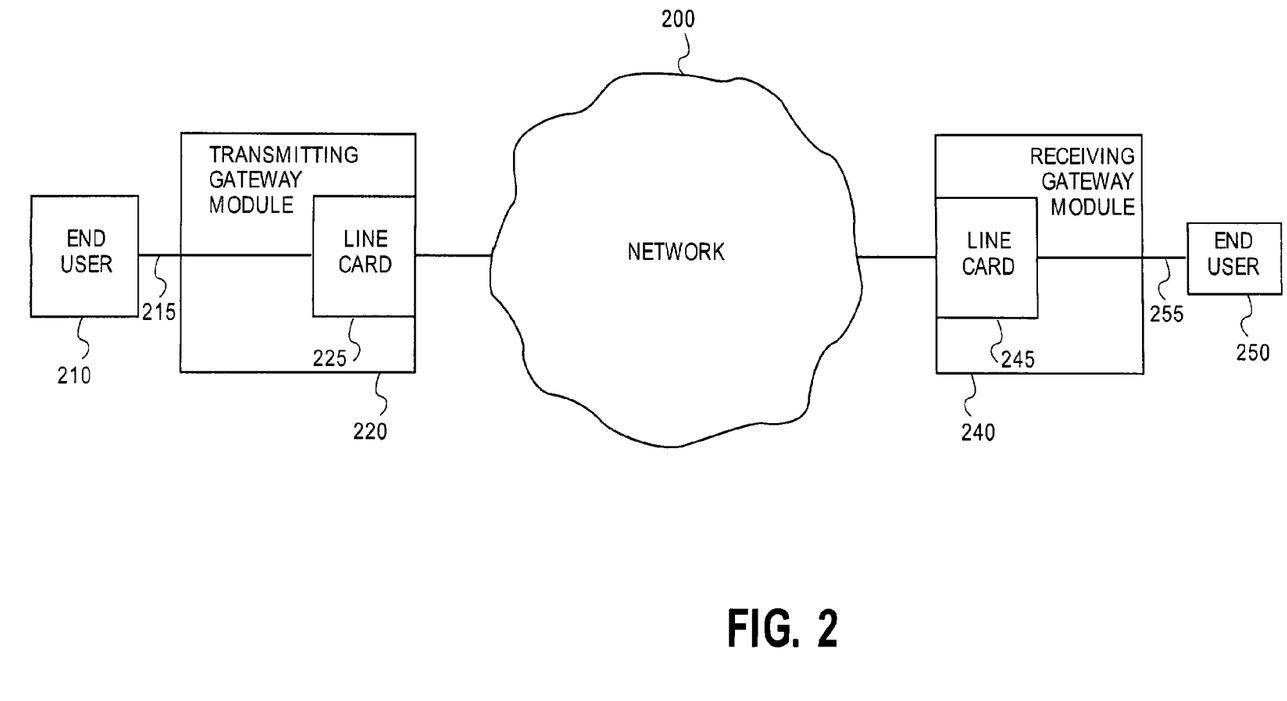
FIG. 2 shows an exemplary packet network for handling voice communications.

FIG. 2 shows an exemplary connection-oriented network for handling voice communications, such as voice calls. As shown in FIG. 2, in one embodiment, an end user 210, trying to initiate a voice call directed to a second end user 250, transmits a sequence of bits along link 215 to a network 200 via a transmitting first gateway module 220. The transmitting gateway module 220 includes a line card 225 connected to the network. In one embodiment, line card 225 is a VISM card, available from Cisco Systems, Inc., of San Jose, Calif. In one embodiment, the sequence of bits is transmitted at a standard rate into gateway module 220, is received by the line card 225, and translated into packets.

In one embodiment, the translation procedure also includes a compression procedure, applied to reduce redundancy in the voice packets. In addition, the translation may include a silence suppression algorithm, or Voice Activity Detection (VAD), which suppresses transmission of data during silence intervals. This results in reducing the transmitted bit rate when the user is not communicating.

Referring again to FIG. 2, the data packets are then sent through the network 200 and reach a receiving second gateway module 240, prior to being delivered to the second user 250. The receiving gateway module 240 also includes a line card 245 connected to the network 200. In one embodiment, line card 245 is a VISM card, available from Cisco Systems, Inc., of San Jose, Calif. Once received within line card 245 of gateway module 240, the packets are decoded and translated back into a sequence of bits representing voice, which are then transmitted to user 250 along link 255. The system for improving reliability of the network 200 will now be described in further detail.

The same process of transmission, encoding, and decoding may also take place from end user 250 through gateway module 240, network 200, and gateway module 220 to end user 210.

Figure 3:
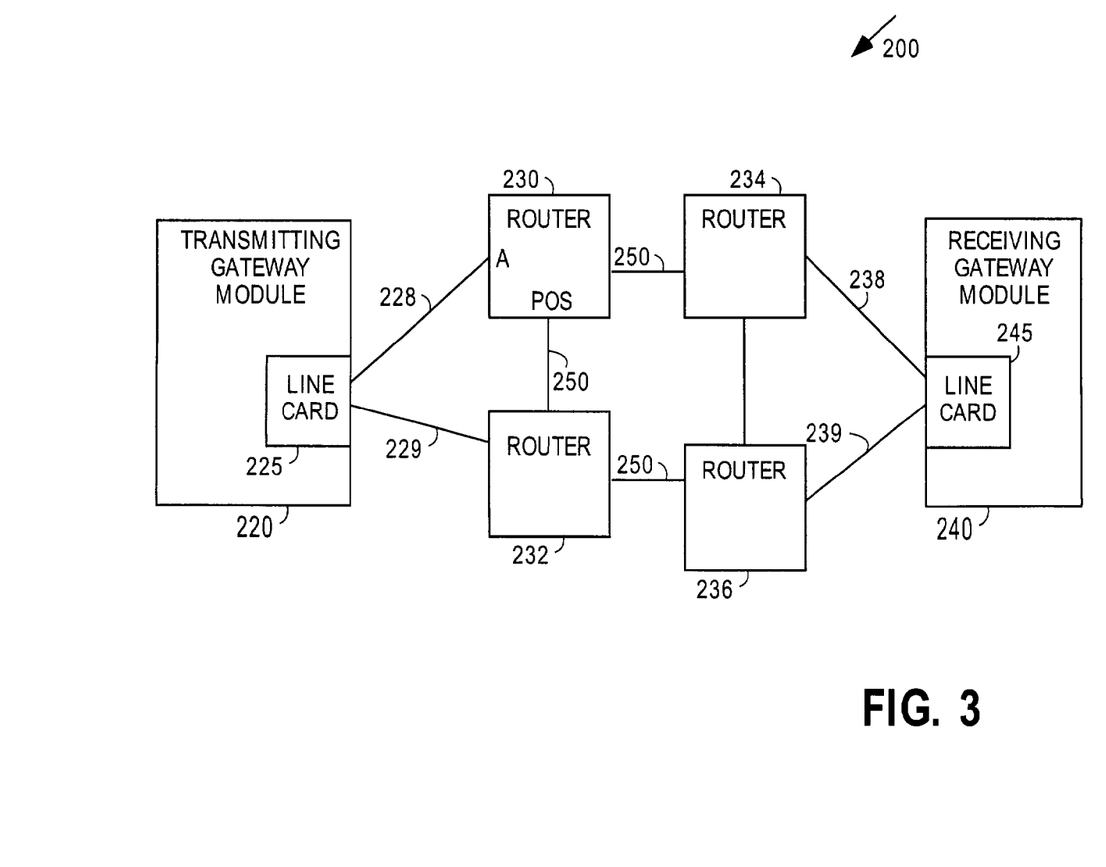
FIG. 3 shows one embodiment of the system for improving reliability of an Internet Protocol network.

FIG. 3 shows one embodiment of the system for improving reliability of an Internet Protocol network. As illustrated in FIG. 3, line card 225 within gateway module 220 is connected to line card 245 within gateway module 240 through a core of routers 230, 232, 234, 236 provided within network 200. In one embodiment, routers 230, 232, 234, 236 are high-speed routers with ATM interfaces interconnected using communication links 250. In one embodiment, the communication links 250 are Packet over SONET links, having fully redundant APS protection.

Line card 225 is connected to router 230 through a link carrying an ATM virtual circuit 228 and is further connected to router 232 through another link carrying ATM virtual circuit 229. At the same time, line card 245 is connected to router 234 via a link carrying ATM virtual circuit 238 and is further connected to router 236 via a link carrying ATM virtual circuit 239. The ATM virtual circuits 228, 229, 238, 239 can support multiple voice connections between gateway modules 220 and 240. Each virtual circuit 228, 229, 238, 239 is provisioned with a predetermined bandwidth, sufficient to support all connections established by gateway modules 220 and 240. In one embodiment, each virtual circuit uses the entire predetermined bandwidth to accommodate the connections. Alternatively, each virtual circuit may use only a portion of the bandwidth, with the remaining bandwidth being used by other data traffic within the network.

In one embodiment, if a user initiates a voice call through gateway module 220, line card 225 establishes a connection along virtual circuit 228, through routers 230 and 234, along virtual circuit 238 to line card 245 within gateway module 240, and on to a second user. Data packets are transmitted along the established connection to the second user. Alternatively, line card 225 within gateway module 220 may establish a connection along virtual circuit 229, through router 232 and 236 to line card 245 within gateway module 240 or to another gateway module (not shown) and its respective user.

In the event of a network failure along communication links 250, the APS system reroutes the flow of data packets from a failed link onto another redundant link, thereby restoring the connection between the two gateway modules 220 and 240. A method for restoring the connection in the event of a router failure or any other failure within network 200 will be described in further detail below.

In one embodiment, line card 225 within gateway module 220 establishes a connection along virtual circuit 228 and starts transmission of data packets through routers 230 and 234. Line card 245 within gateway module 240 monitors each connection along virtual circuits 238 and 239 and receives data sent from line card 225 along virtual circuit 238. In one embodiment, if a failure is declared in router 230 or router 234 within network 200, the connection which allows the flow of data packets along virtual circuit 238 is affected and line card 245 stops receiving data. Alternatively, the failure may be declared on the link carrying virtual circuit 228 or the link carrying virtual circuit 238.

Line card 245 within gateway module 240 continues to monitor both virtual circuits 238 and 239, and transmits a type A message along virtual circuits 238 and 239 if data is not received on the established connection for a predetermined period of time. In one embodiment, the predetermined period of time is 50 milliseconds, selected to ensure that line card 245 does not interpret a short interruption in the flow of data packets as a network failure. Alternatively, another time period may be selected with the same results.

Line card 245 within gateway module 240 will not monitor the virtual circuits for a gap in receipt of data packets until a first data packet is received on that particular connection. Line card 245 will wait for the first data packet, then monitor the virtual circuits 238 and 239 for the gap, and transmit the type A message if the gap is greater than the predetermined period of time of 50 milliseconds.

The message travels along virtual circuits 238 and 239 and will eventually reach line card 225 within gateway module 220. In one embodiment, if the failure is declared on either router 230 or 234, or along virtual circuits 228 or 238, the message will be transmitted through routers 236 and 232 and will be received by line card 225 along virtual circuit 229.

Once line card 225 within gateway module 220 receives the message, it switches transmission of data from virtual circuit 228 to virtual circuit 229. Data packets will now be transmitted along virtual circuit 229, through routers 232 and 236, and along virtual circuit 239. In one embodiment, line card 225 switches virtual circuits on an individual connection-by-connection basis. Since the failure may be declared anywhere within network 200, other connections within virtual circuit 228 may not be affected and will not be switched to a different virtual circuit.

Line card 225 within gateway module 220 must complete the switchover and resume transmission of data along virtual circuit 229 within a predetermined period of time, in order to ensure that the voice communication will not be dropped.

In one embodiment, the predetermined period of time is 500 milliseconds. Alternatively, other time periods may be selected.

Meanwhile, line card 245 within gateway module 240 continues to monitor both virtual circuits 238 and 239 to detect the arrival of data packets. If line card 245 continues to fail to receive any data packets on either virtual circuit for a predetermined period of time after transmission of the type A message, then line card 245 retransmits another type A message along both virtual circuits 238 and 239. In one embodiment, the predetermined period of time is 250 milliseconds and is selected to avoid a flood of messages reaching line card 225 and prompting it to switch the connection continuously between virtual circuits 228 and 229. Alternatively, another period of time may be selected to accomplish the same objective.

In one embodiment, line card 225 within gateway module 220 decides to end the connection and stop transmission of data packets. Line card 245 within gateway module 240 will detect the delay in receipt of data packets, but will not know whether the delay reflects the end of the communication or a network failure. Therefore, line card 245 will transmit the message signaling the network failure at the predetermined time intervals. Line card 225 will receive the periodic messages, but will discard the messages without switching virtual circuits and establishing a new connection.

In one embodiment, line card 225 within gateway module 220 encounters a silence-induced gap in transmission of data packets, which appears as a result of a silent period during the voice communication, i.e. when the user is not communicating. As a result, although the connection is still active, line card 225 has no data packets to transmit for a period of time. Line card 245 within gateway module 240 will detect the gap in receipt of data packets, but will not know whether the gap reflects the silence-induced gap or a network failure and will transmit the message signaling the network failure at the predetermined time intervals. While line card 225 within gateway module 220 still detects the gap, it will receive and discard the messages without switching virtual circuits.

Alternatively, when line card 225 initially encounters the gap, it may send a type B message to line card 245 signaling appearance of a gap in transmission of data. When line card 245 receives the type B message signaling the gap, it will not start the 50 milliseconds timer and will not send a message during the gap in transmission.

Figure 4:
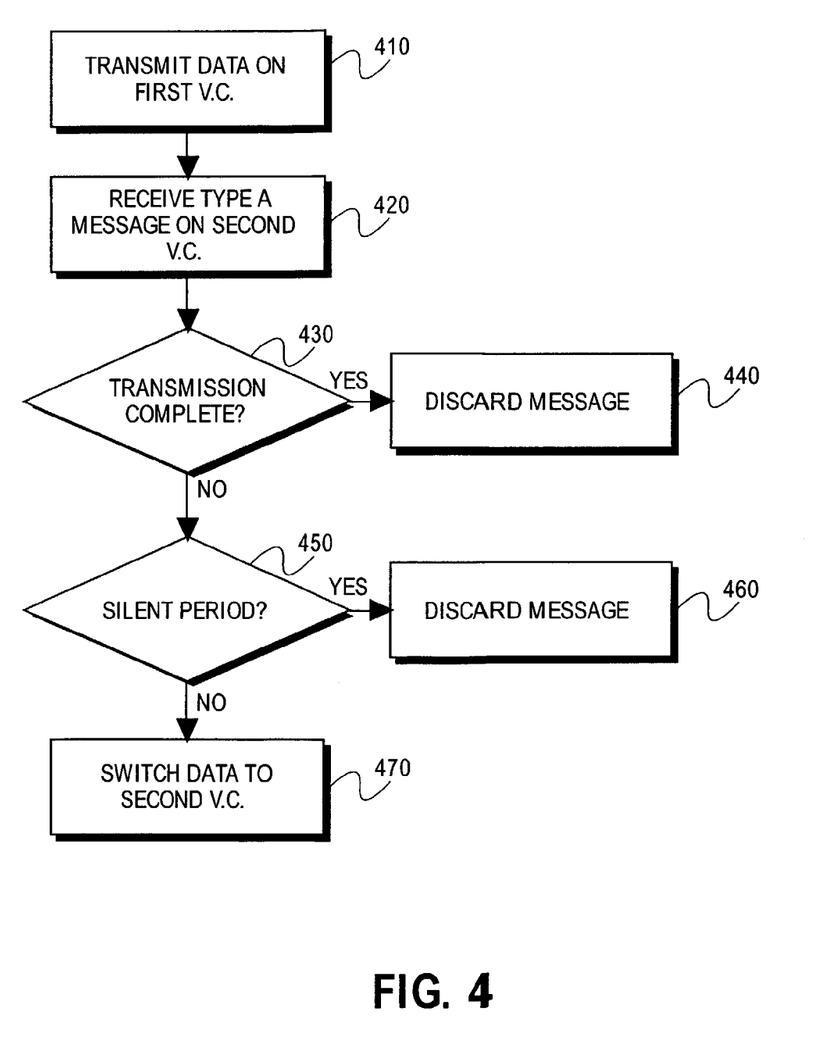
FIG. 4 is a flow diagram representing the method for improving reliability of a packet network as applied to a transmitting gateway module.

FIG. 4 is a flow diagram representing the method for improving reliability of a packet network as applied to a transmitting gateway module. As shown in the flow diagram of FIG. 4, at processing block 410, line card 225 within gateway module 220 transmits data packets on a first virtual circuit 228 along an established connection. At processing block 420, line card 225 receives a message signaling a failure in the network on a second virtual circuit 229. At processing block 430, line card 225 checks whether the transmission of data is complete and the connection has become inactive.

If transmission is complete, line card 225 discards the message at processing block 440. Otherwise, if data still needs to be transmitted, line card 225 verifies whether a silent period has occurred and whether the delay is temporary at processing block 450.

If a silent period has occurred, line card 225 discards the message at processing block 460. Otherwise, at processing block 470, line card 225 switches transmission of data to virtual circuit 229.

Figure 5A:
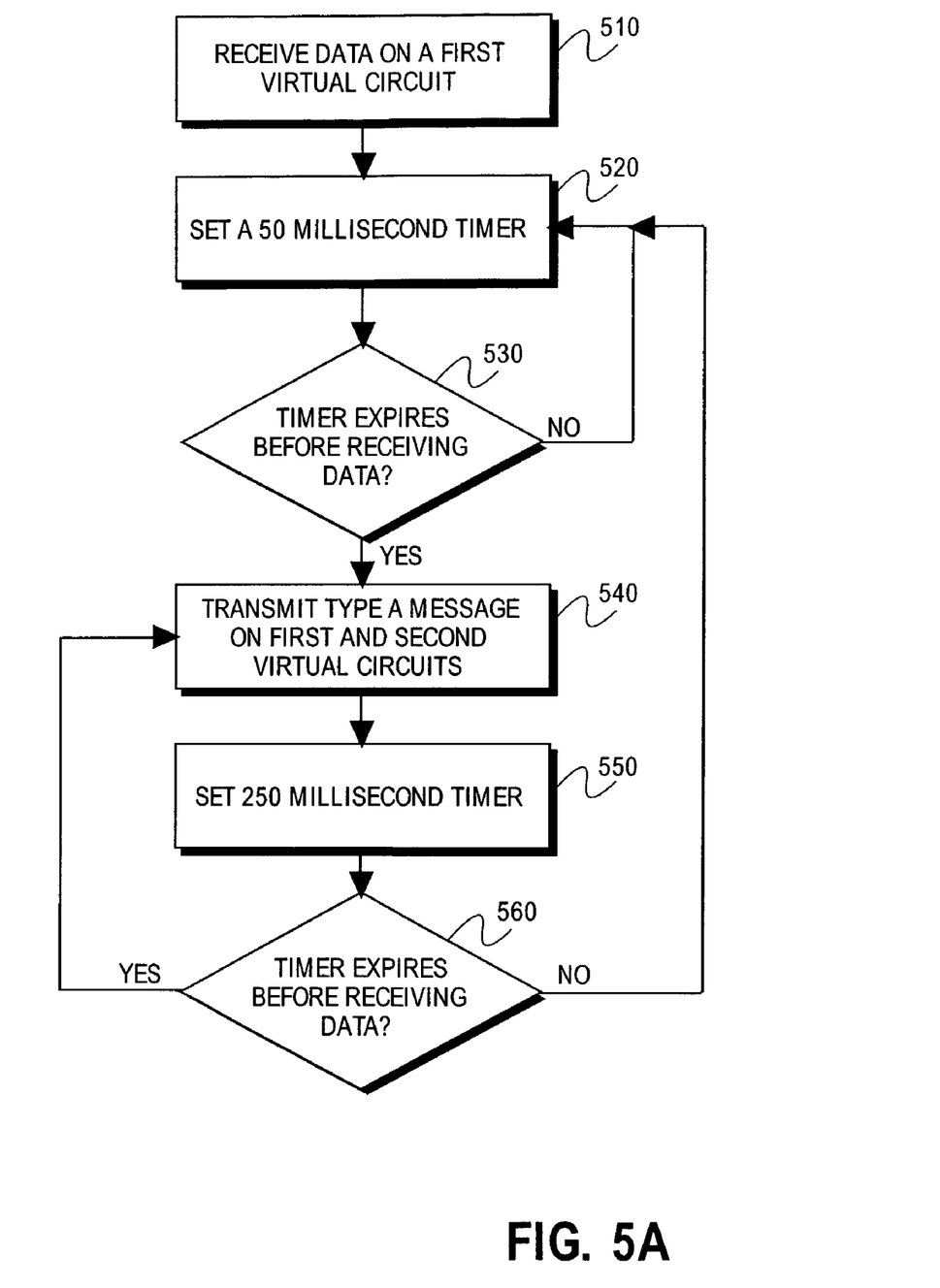
FIGS. 5a and 5b are flow diagrams representing methods for improving reliability of a packet network as applied to a receiving gateway module.

FIG. 5*a* is a flow diagram representing the method for improving reliability of a packet network as applied to a receiving gateway module. As shown in the flow diagram of FIG. 5*a*, at step 510, receiving line card 245 within gateway module 240 receives data on a first virtual circuit 238 along an established connection.

A timer is then set for 50 milliseconds, step 520. Then, the process determines whether the timer expires before data is received, step 530. If data is received before the timer expires, step 520 is repeated and the timer is reset for another 50 milliseconds. If the timer expires before data is received, then a type A message is transmitted on first and second virtual circuits, step 540. A type A message indicates that no data has been received for a certain period of time. A timer is then set to 250 milliseconds, step 550. The process then determines whether the timer expires before data is received, step 560. If not, then the process continues at step 520. If the timer does expire before receiving data, then the process continues at step 540.

Figure 5B:
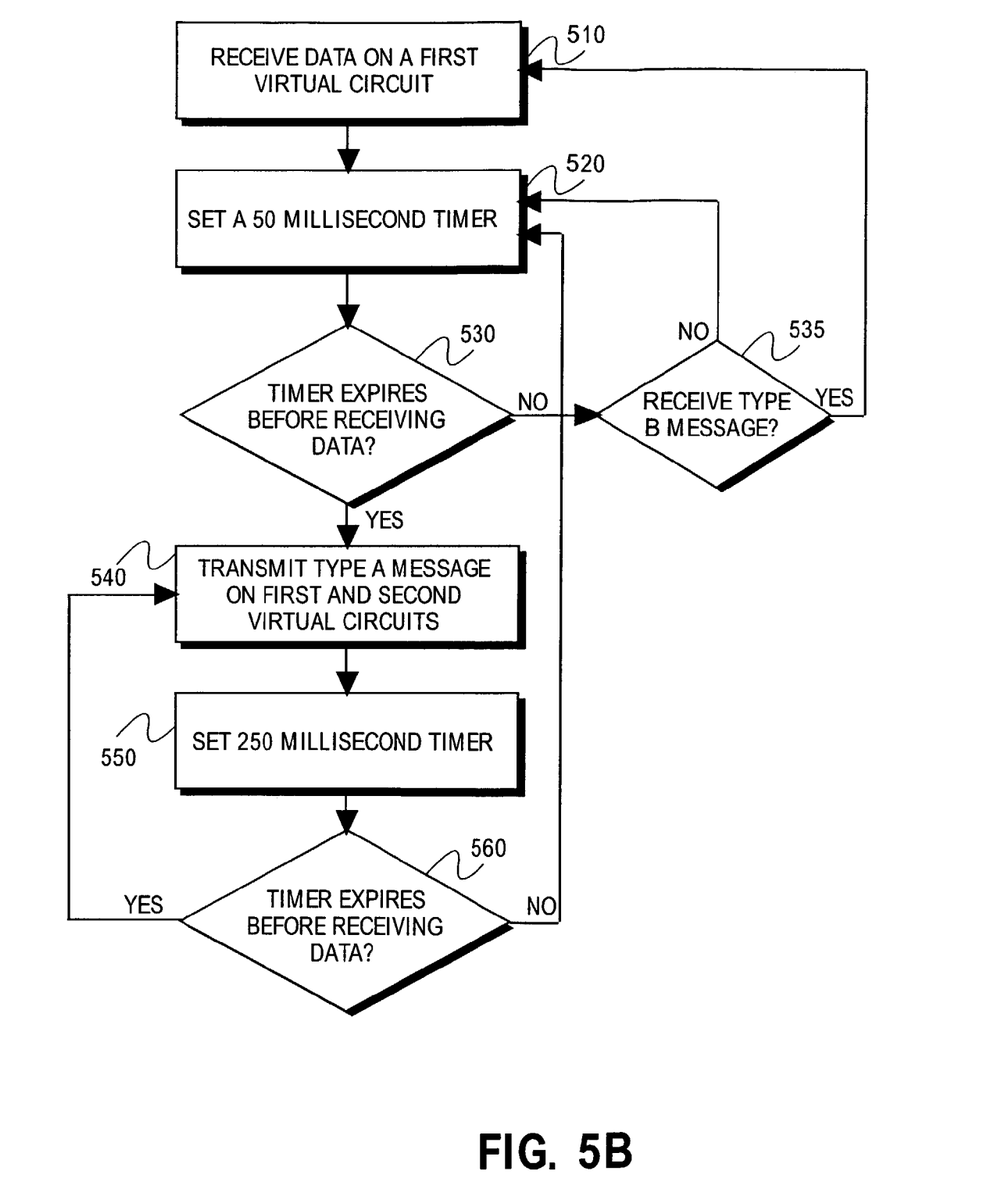

FIG. 5*b* shows an alternative embodiment of a method for improving reliability of a packet network as applied to a receiving gateway module. As shown in the flow diagram of FIG. 5*b*, at step 510, receiving line card 245 within gateway module 240 receives data on a first virtual circuit 238 along an established connection.

A timer is then set for 50 milliseconds, step 520. Then, the process determines whether the timer expires before data is received, step 530. If data is received before the timer expires, the process determines whether a type B message is received, step 535. A type B message indicates the beginning of a silent period. If the type B message has not been received, then step 520 is repeated and the timer is reset for another 50 milliseconds. If a type B message is received, then the process continues at step 510 and data is received on the first virtual circuit.

If the timer expires before data is received, then a type A message is transmitted on first and second virtual circuits, step 540. A timer is then set to 250 milliseconds, step 550. The process then determines whether the timer expires before data is received, step 560. If not, then the process continues at step 520. If the timer does expire before receiving data, then the process continues at step 540.

In addition to operating as described, the roles of the transmitting line card 225 within gateway module 220 and the receiving line card 245 within gateway module 240 may also be reversed to allow for the transmission of data in both directions between the end users, 210 and 250.

Asynchronous Transfer Mode (ATM) Network Implementation

Figure 6:
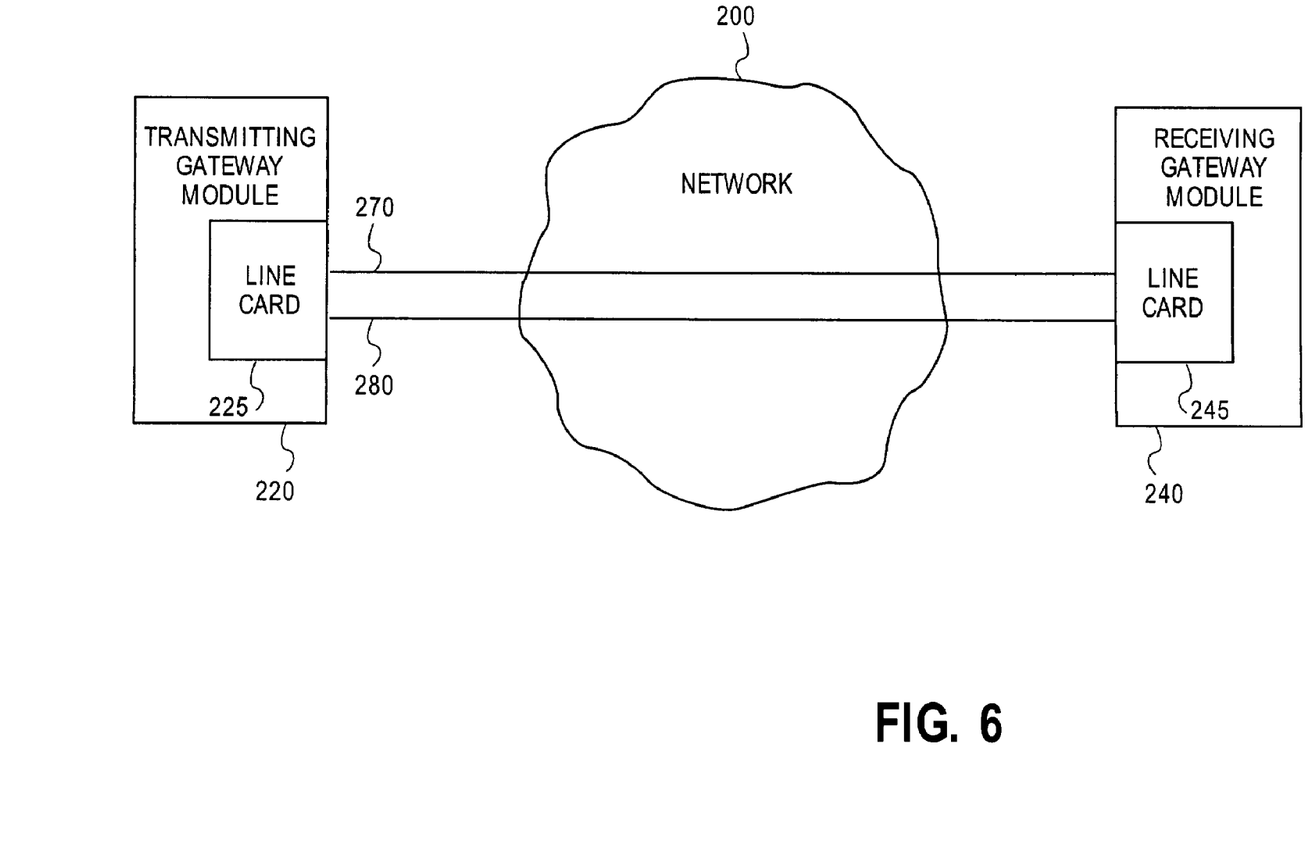
FIG. 6 shows an alternate embodiment of the system for improving reliability of an Asynchronous Transfer Mode network.

FIG. 6 shows an alternate embodiment of the system for improving reliability in an Asynchronous Transfer Mode (ATM) network. As illustrated in FIG. 6, if network 200 is an ATM network, data transport relies on end-to-end virtual circuits. End-to-end virtual circuits connect line cards within respective gateway modules and avoid a connection to a router within the network. In one embodiment, the virtual circuits are Switched Virtual Circuits (SVCs).

Referring to FIG. 6, each voice connection established between line card 225 within gateway module 220 and line card 245 within gateway module 240 requires two SVCs 270 and 280 to be established. Each of the two SVCs 270 and 280 uses a different routing to accommodate the connection. Line card 225 uses one SVC, for example, in one embodiment, SVC 270, to transmit and receive data to and from line card 245. In this embodiment, SVC 280 is a standby virtual circuit and is not used for transmission of data until a failure is detected and declared within network 200. Line cards 225 and 245 are initially provisioned to only monitor SVC 270 for receipt of data packets.

When a failure is detected within network 200, and the failure affects SVC 270, the flow of data packets along SVC 270 stops and line cards 225 and 245 stop receiving data. Assuming the network failure is closer to line card 245 than line card 225, line card 245 is the first one to detect the gap of a predetermined duration in receipt of data packets and sends a type A message signaling the gap to line card 225 along both SVCs 270 and 280. In one embodiment, the predetermined period of time is 50 milliseconds. At the same time, line card 245 switches to SVC 280 and monitors SVC 280 for arrival of data. However, line card 245 continues to transmit data packets to line card 225 along SVC 270.

Line card 225 also detects a gap of a predetermined duration in receipt of data from line card 245 and subsequently sends a similar type A message signaling the gap to line card 245 along both SVCs 270 and 280. At the same time, line card 225 switches to SVC 280 in order to monitor SVC 280 for arrival of data, while continuing to send data along SVC 270.

Next, line card 225 receives the message sent by line card 245 and starts transmission of data packets along SVC 280. Subsequently, line card 245 receives the message sent by line card 225 and starts transmission of data packets along SVC 280. Therefore, the connection established between line cards 225 and 245 is switched to the standby SVC 280 and a drop is avoided.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    transmitting data on a first virtual circuit in a network along one connection of a plurality of connections established in said first virtual circuit;
    receiving a message on a second virtual circuit in said network, said message signaling a possible failure detected in said network; and
    switching transmission of said data from said first virtual circuit to said second virtual circuit in response to the message unless a predetermined gap in transmission of said data along said one connection is detected, wherein said data are voice packets of a voice call and said predetermined gap is a result of a silent period in said call.

2. The method according to claim 1, wherein said network is an Internet Protocol (IP) network.

3. The method according to claim 1, wherein said network is an Asynchronous Transfer Mode (ATM) network.

4. The method according to claim 1, wherein receiving said message further comprises monitoring said first virtual circuit and said second virtual circuit.

5. The method according to claim 1, wherein a predetermined bandwidth to support said plurality of connections is assigned to said first virtual circuit and said second virtual circuit.

6. The method according to claim 1, wherein said switching occurs such that said call is not dropped.

7. The method according to claim 1, wherein said switching further comprises transmitting data related to said one connection on said second virtual circuit.

8. The method according to claim 1, wherein said switching is performed on an individual connection-by-connection basis, so that others of said plurality of connections in said first virtual circuit that are not affected are not switched.

9. A method comprising:
    transmitting data on a first virtual circuit in a network along one connection of a plurality of connections established in said first virtual circuit;
    receiving a message on a second virtual circuit in said network, said message signaling a possible failure detected in said network; and
    switching transmission of said data from said first virtual circuit to said second virtual circuit unless a predetermined gap in transmission of said data along said one connection is detected in which case a data packet signaling said predetermined gap is transmitted on the first virtual circuit.

10. The method according to claim 1, wherein said switching further comprises:
    canceling transmission of said data along said one connection in said first virtual circuit;
    establishing a second connection in said second virtual circuit; and
    transmitting said data along said second connection in said second virtual circuit.

11. A method comprising:
    transmitting data on a first virtual circuit in a network along one connection of a plurality of connections established in said first virtual circuit;
    receiving a message on a second virtual circuit in said network, said message signaling a possible failure detected in said network; and
    switching transmission of said data from said first virtual circuit to said second virtual circuit unless transmission of said data along said one connection is complete in which case the message is discarded.

12. The method according to claim 1, wherein said one connection is a Voice over Internet Protocol (VoIP) connection.

13. The method according to claim 1, wherein said one connection is a Voice over Asynchronous Transfer Mode (VoATM) connection.

14. A method suitable for re-routing the flow of data packets in the event of a network failure, comprising:
    providing first and second virtual circuits that connect a pair of end nodes in a network, wherein a connection between the end nodes can be established through either virtual circuit; and then
    receiving data packets on the first virtual circuit at one of the end nodes; and then
    transmitting on the first and second virtual circuits by said one of the end nodes messages to the other end node, in response to not having received a data packet for a predetermined period of time; and then
    receiving on the second virtual circuit at said one of the end nodes data packets of said connection.

15. The method according to claim 14, wherein said network is an Internet Protocol (IP) network.

16. The method according to claim 14, wherein said network is an Asynchronous Transfer Mode (ATM) network.

17. The method according to claim 14, further comprising:
monitoring said first virtual circuit and said second virtual circuit at said one of the end nodes for a second predetermined period of time after transmitting said messages; and
transmitting on the first and second virtual circuits by said one of the end nodes messages to the other end node, if a data packet of said connection is not received during said second predetermined period of time.

18. The method according to claim 14, wherein said predetermined period of time is selected so that said one of the end nodes does not interpret a short interruption in data packet flow as a network failure.

19. The method according to claim 17, wherein said second predetermined period of time is 250 milliseconds.

20. The method according to claim 14, further comprising monitoring said first virtual circuit and said second virtual circuit for said predetermined period of time.

21. The method according to claim 14, wherein a plurality of connections is established on said first virtual circuit.

22. The method according to claim 14, wherein said data packets are received along said connection being one of said plurality of connections established in said first virtual circuit.

23. The method according to claim 22, further comprising monitoring said connection for said predetermined period of time.

24. The method according to claim 22, further comprising detecting a failure on said connection in said first virtual circuit.

25. The method according to claim 24, wherein said detecting is performed subsequent to receiving an initial one of the data packets along said connection.

26. The method according to claim 20, wherein said monitoring is performed subsequent to receiving an initial one of the data packets on said first virtual circuit.

27. The method according to claim 21, wherein a predetermined bandwidth to support said plurality of connections is assigned to said first virtual circuit and said second virtual circuit.

28. The method according to claim 22, wherein said connection is a Voice over Internet Protocol (VoIP) connection.

29. The method according to claim 22, wherein said connection is a Voice over Asynchronous Transfer Mode (VoATM) connection.

30. An apparatus comprising:
means for transmitting data for a voice call on a first virtual circuit in a network;
means for receiving a message on a second virtual circuit in said network, said message signaling a possible failure detected in said network; and
means for switching transmission of data for said voice call from said first virtual circuit to said second virtual circuit unless a gap in transmission of said data is determined to be due to a silent period in said voice call.

31. The apparatus according to claim 30, wherein said means for receiving further comprises means for monitoring said first virtual circuit and said second virtual circuit.

32. An apparatus comprising:
means for receiving data for a voice call on a first virtual circuit in a network;
means for transmitting a message on a second virtual circuit and said first virtual circuit in said network, if said data is not received for a predetermined period of time selected so that transmission of data can be switched from the first virtual circuit to the second virtual circuit without the voice call being dropped; and
means for receiving said data on said second virtual circuit in said network.

33. The apparatus according to claim 32, further comprising:
means for monitoring said first virtual circuit and said second virtual circuit for a second predetermined period of time; and
means for transmitting said message if said data is not received during said second predetermined period of time.

34. A computer readable medium having instructions which, when executed by a processing system, cause the system to:
transmit data for a voice call on a first virtual circuit in a network;
receive a message on a second virtual circuit in said network, said message signaling a possible failure detected in said network; and
switch transmission of said data from said first virtual circuit to said second virtual circuit unless transmission of data for said voice call is complete in which case the message is discarded.

35. The medium of claim 34, wherein the executed instructions further cause the system to:
receive said message by monitoring said first virtual circuit and said second virtual circuit.

36. A computer readable medium having instructions which, when executed by a processing system, cause the system to:
receive data packets of a connection on a first virtual circuit in a network; and then
transmit a message on a second virtual circuit and said first virtual circuit in said network, in response to a data packet of the connection not having been received for a predetermined period of time; and then
receive data packets of the connection on said second virtual circuit in said network.

37. The medium of claim 36, wherein the executed instructions further cause the system to:
monitor said first virtual circuit and said second virtual circuit for a second predetermined period of time after transmitting said message; and
transmit said message again if a data packet of the connection is not received during said second predetermined period of time.

38. An apparatus comprising:
circuitry to transmit data for a voice call on a first virtual circuit in a network;
circuitry to receive a message on a second virtual circuit in said network, said message signaling a possible failure detected in said network; and
circuitry to switch transmission of data for said voice call from said first virtual circuit to said second virtual circuit unless a gap in transmission of said data is determined to be due to a silent period in said voice call.

39. The apparatus according to claim 38, wherein said circuitry to receive further comprises circuitry to monitor said first virtual circuit and said second virtual circuit.

40. An apparatus comprising:
circuitry to receive data for a voice call on a first virtual circuit in a network;

circuitry to transmit a message on a second virtual circuit and said first virtual circuit in said network, if said data is not received for a predetermined period of time selected so that transmission of data can be switched form the virtual circuit to the second virtual circuit without the voice call being dropped; and circuitry to receive said data on said second virtual circuit in said network.

41. The apparatus according to claim 40, further comprising:

circuitry to monitor said first virtual circuit and said second virtual circuit for a second predetermined period of time; and circuitry to transmit said message if said data is not received during said second predetermined period of time.

\* \* \* \* \*

UNITED STATES PATENT AND TRADEMARK OFFICE
CERTIFICATE OF CORRECTION

PATENT NO. : 7,039,007 B1
APPLICATION NO. : 09/629316
DATED : May 2, 2006
INVENTOR(S) : Abdelhamid et al.

It is certified that error appears in the above-identified patent and that said Letters Patent is hereby corrected as shown below:

On the title page (page 1): (item 73) the Assignee is listed as "Cicso Technology, Inc." Assignee should be listed as --Cisco Technology, Inc.--.

column 11, line 5: delete "form the virtual circuit" and insert --from the first virtual circuit--.

Signed and Sealed this

Twelfth Day of September, 2006

JON W. DUDAS
*Director of the United States Patent and Trademark Office*